W. A. JOHNSON.
RECOIL CHECK.
APPLICATION FILED MAR. 18, 1911.
1,034,115.
Patented July 30, 1912.
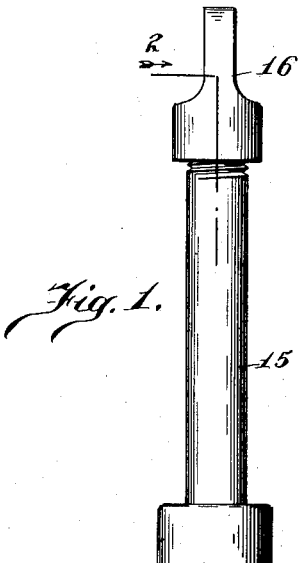
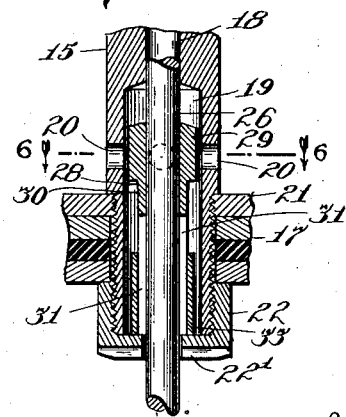
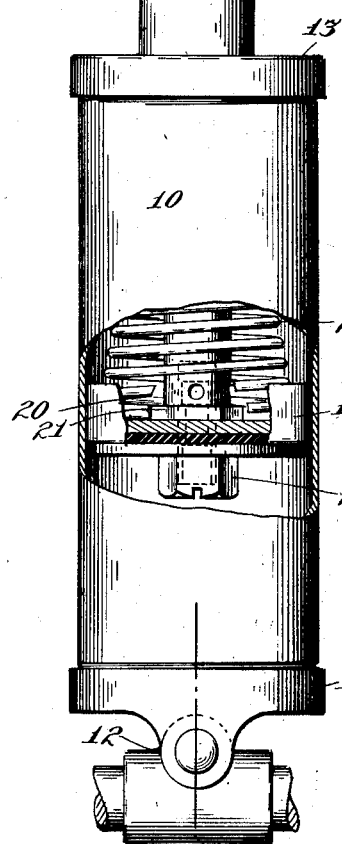
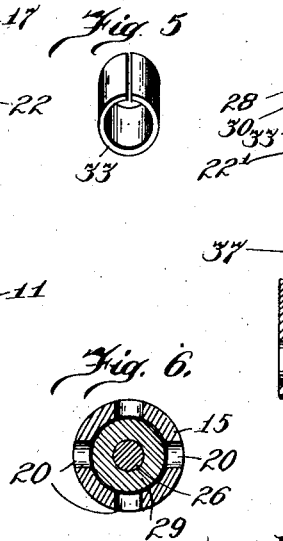
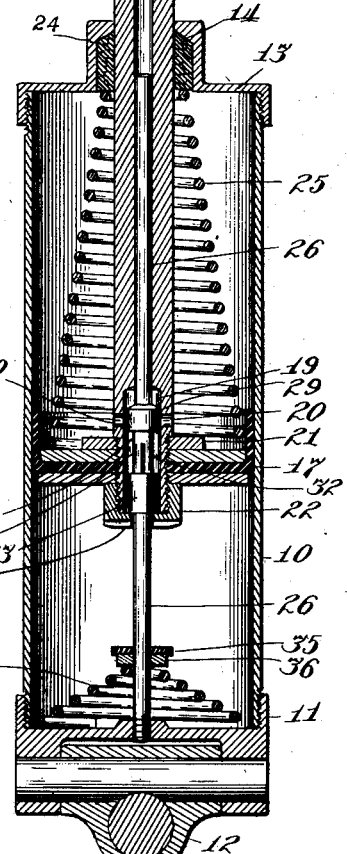
Witnesses
Milton Lenoir
Charles J. Gantzer
Inventor
William A. Johnson
By Gorie Barnes May
Attorneys.

UNITED STATES PATENT OFFICE.

WILLIAM A. JOHNSON, OF CHICAGO, ILLINOIS.

RECOIL-CHECK.

1,034,115.  Specification of Letters Patent.  Patented July 30, 1912.

Application filed March 18, 1911. Serial No. 615,212.

*To all whom it may concern:*

Be it known that I, WILLIAM A. JOHNSON, a citizen of the United States, residing at Chicago, in the county of Cook and State of Illinois, have invented certain new and useful Improvements in Recoil-Checks, of which the following is a specification.

My invention relates to improvements in recoil checks, and has for its general object to provide a simple, efficient, and practical device wherein a fluid cushioning medium is used, and the movements of said medium are valve-controlled by advantageous mechanism.

As one exemplification of my invention, I have shown in the accompanying drawing an automobile shock recoil absorber, and in said drawing:

Figure 1 is a side elevation with parts broken away, showing the complete device; Fig. 2 is a vertical section on line 2—2 of Fig. 1; Fig. 3 is an enlarged sectional detail of the piston valve and contiguous parts; Fig. 4 is an enlarged detail of the valve proper; Fig. 5 is a detail of a spring sleeve; and Fig. 6 is a sectional detail on line 6—6 of Fig. 3.

In the specific exemplification shown, 10 is a cylinder having one end closed by the cap 11, threaded thereon, and preferably providing exterior means for attachment to one of the two parts whose relative movements are to be controlled. Such connection may conveniently be made by universal joint, generally indicated at 12, of construction well known in the art. The other end of the cylinder is covered by a cap 13 threaded thereon, providing a centrally apertured hollow boss, 14, to guide a piston rod and to receiving packing therefor.

The piston rod 15 carries at its outer end attaching means such as the eye-head 16 for connection with the remaining one of the two parts whose relative movements are to be controlled, and at its inner end it carries a piston generally indicated at 17 working within the cylinder. The piston rod is preferably made of tubular stock, to provide a central guiding bore, 18, closed at its outer end and at its inner open end enlarged into a valve chamber 19 into which open above the piston 17, suitable ports 20.

The piston 17 may be of any desired form, that herein shown being of ordinary cup form common in air pumps, mounted exteriorly on the rod 15 and positioned by nuts 21 and 22, the end nut 22 being in the form of an apertured cap providing an annular flange 22' to form a stop partially overlying the end of the valve chamber 19. In the present form of construction, the piston is intended to compress fluid only on its out-stroke, the end opening of the casing being packed with a body 24 of relatively soft packing material, constantly maintained under pressure by a helical spring 25 interposed between said packing and the piston 17, so that the pressure is least when the piston is at the extreme end of its in-stroke, and increases as the piston works on its out-stroke, thereby insuring maximum packing pressure when the piston is compressing the fluid confined in the pressure chamber on the outer side of the piston.

26 indicates a guide rod centrally secured to the head 11, and extending into the guiding bore 18 of the piston rod, and 28 indicates a slide valve of the piston-type, disposed within the valve chamber 19 and frictionally engaging the guide rod 26. The valve 28 provides a head 29, slidable in the valve chamber 19 and preferably making slightly loose fit therein, so that when it is interposed in front of the ports 20, as indicated in Fig. 3, it may allow slight leakage of air through said ports. The stem 30 of the valve is preferably slotted as at 31 to form of the stem an annular series of parallel spring fingers 32, and these are made to exert a clamping action upon the rod 26, preferably by enveloping said fingers with a spring sleeve 33 of steel. As shown in Fig. 3, the relation of the valve to its chamber is such that when valve stem 30 bottoms upon the shoulder 22' at the open end of the chamber, the head 29 practically closes the ports 20, but it will be apparent that when the valve 28 is lifted to the top of the chamber 19 its head 29 will clear the ports 20 leaving free a passage through the piston by way of ports 20 and the open ended valve chamber 19.

The device thus far described is completely operative, but as a further refinement, I provide a limitation valve at the inner end of the casing yielding to coact with the normally open end of the piston valve chamber to close the air passage through the piston when the piston nears the head 11 of the cylinder. Specifically, 35 indicates a valve of leather or the like surrounding the guide rod 26, and slidable thereon, supported upon a plate 36, which is yieldingly maintained at a definite distance from the end of the chamber by a helical spring 37.

Assuming the opposite attaching devices to be connected one to the spring and one to the frame member of an automobile, the operation of the device is as follows: When the piston is driven farther into the cylinder by the relative approach of the vehicle running gear and frame attendant upon a shock or bump, the frictional grip of the valve 28 on the guide rod holds it stationary until the top of the valve chamber 19 forces it downward. Thus, the ports 20 are opened to permit the free flow of air through the piston, during the whole of the in-stroke of the piston, or until the end of nut 22 seats against the limitation valve 35, thereby finally to inclose a body of air in the inner end of the cylinder to aid the vehicle spring in checking the further relative approach of the vehicle members, and to prevent the piston from striking the cylinder end. As the recoil takes place between the vehicle members, the piston valve 28 remains stationary in virtue of its frictional grip on the guide rod 26, until the shoulder 22' of nut 22 engages the lower end of the valve stem. In this position, the valve closes the ports 20 and the out-stroke of the piston is retarded strongly by the resistance of the air chambered above the piston, so that the vehicle parts quickly come to normal relation without bouncing. The air pressure in the upper portion of the cylinder is gradually relieved by the slight leakage intentionally permitted past the valve head 29, while the vehicle elements are separating, and as soon as the recoil is checked, the reduced pressure tends to force the piston down slightly and then the passage 20—19 is opened again, permitting quick restoration of the pressure on opposite sides of the piston to equilibrium. Thus, the construction described permits the vehicle spring to act in one direction with almost perfect freedom, but interposes a material air-cushioned resistance to the rebound of the load resulting from reaction of the spring after compression.

While I have herein described a single embodiment of my invention for purposes of full disclosure, it will be apparent that numerous changes might be made in the construction without departure from the spirit of my invention and within the scope of the appended claims.

What I claim is:

1. In a device of the character described, the combination of a cylinder, a piston having a passageway therethrough, a valve controlling said passageway, a guide member, and spring means embracing a portion of said valve to give it a friction grip on said guide member.

2. In a device of the character described, the combination of a cylinder, a piston therein, a piston rod therefor having a guiding bore and a valve chamber, and ports opening laterally into said valve chamber between its ends, a piston-type slide valve in said chamber provided with a head the cylindrical side surface of which coöperates with said ports and having a limited range of movement to close said ports when at one extreme of movement and to open said ports when at the other extreme of movement, and a guide rod centrally carried by the cylinder frictionally engaged by said valve.

3. In a device of the character described, the combination of a cylinder, a piston, having a passageway therethrough, a valve controlling said passageway, providing a central bore surrounded by an annular series of spring fingers, and a friction rod carried by the cylinder frictionally engaged by said spring fingers to control the movements of the valve.

4. The combination of a cylinder, a piston having a passageway therethrough, a valve controlling said passageway providing a central bore surrounded by an annular series of spring fingers, a friction rod carried by the cylinder frictionally engaged by said spring fingers to control the movements of the valve, and a spring band shorter than the fingers surrounding the latter, and movable thereon.

5. In a device of the character described, the combination of a cylinder, a piston, a piston rod therefor, said piston having a passageway therethrough, said passageway providing a limited space for travel of a valve, a valve in said space arranged when at one extreme of its travel in said space to close the passageway, and when at the other extreme of its travel in said space to open the passageway, and a stationary part carried by the casing entering said passageway and making frictional engagement with said valve to control its relative movement with respect to the valve-containing space.

In testimony whereof I hereunto set my hand in the presence of two witnesses.

WILLIAM A. JOHNSON.

In the presence of—
MARY F. ALLEN,
W. LINN ALLEN.